Nov. 6, 1928.　　　　　　W. L. MARTIN　　　　　　1,690,343
MOTOR VEHICLE BRAKE MECHANISM
Filed July 3, 1922
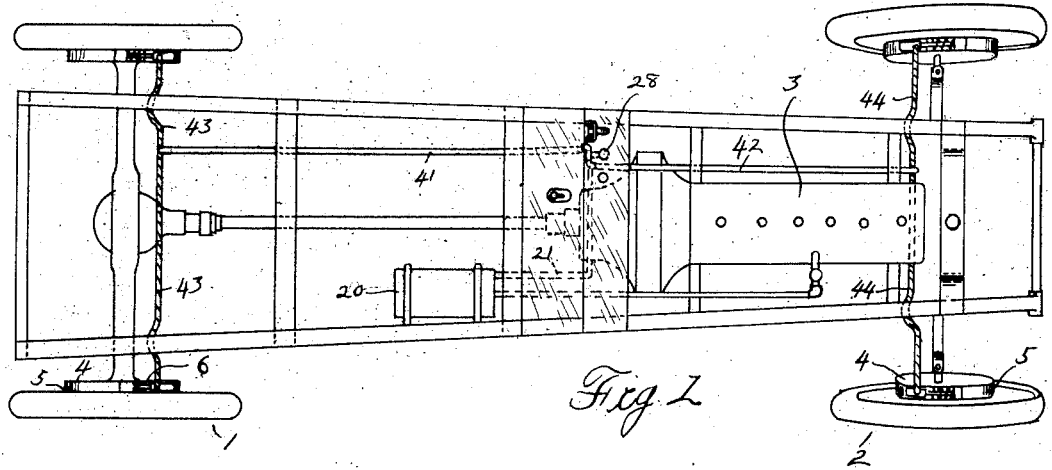
Fig. 1.
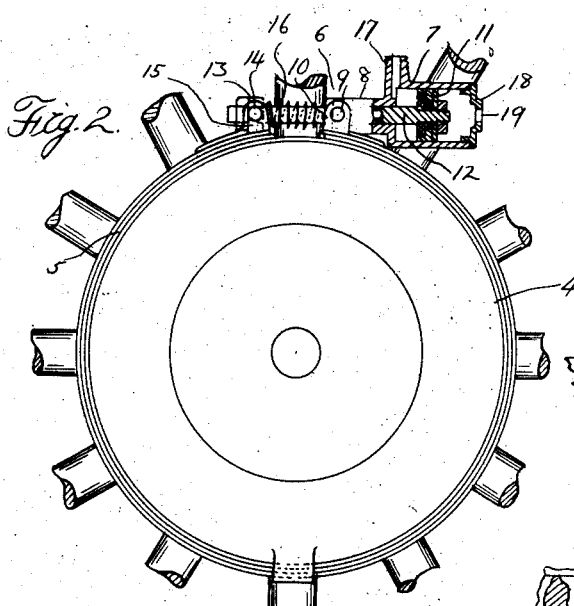
Fig. 2.
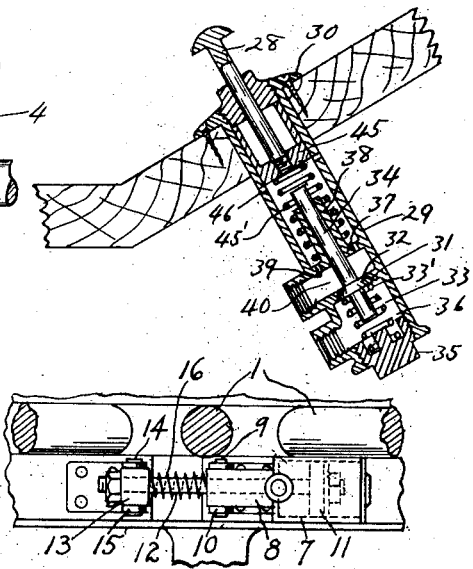
Fig. 3.
Fig. 4.
Fig. 5.
Inventor
William Lincoln Martin
By Whittemore, Hulbert, Whittemore & Belknap.
Attorneys Patented Nov. 6, 1928.

1,690,343

UNITED STATES PATENT OFFICE.

WILLIAM LINCOLN MARTIN, OF DETROIT, MICHIGAN, ASSIGNOR TO GENERAL MOTORS CORPORATION, OF DETROIT, MICHIGAN, A CORPORATION OF DELAWARE.

MOTOR-VEHICLE-BRAKE MECHANISM.

Application filed July 3, 1922. Serial No. 572,581.

The invention relates to motor vehicle brake mechanisms and has for its object the provision of a construction whereby brakes can be applied with equal pressure to the front or steering wheels of the motor vehicle as well as the rear or drive wheels. Other objects are the provision of operating mechanisms for the brake bands which are directly mounted thereon and are actuated by compressed fluid; and the provision of a manually operated control for the passage of the compressed fluid to the brake band operating mechanisms which is adapted to vary the pressure of the compressed fluid actuating the operating mechanisms. Further objects of the invention reside in providing means connected to a cylinder of the internal combustion engine of a motor vehicle arranged to permit the passage of a portion of the combustion gases only from the cylinder to supply the compressed fluid; and in the novel features of construction and combinations and arrangements of parts as more fully hereinafter set forth.

In the drawings:

Figure 1 is a plan view of a motor vehicle embodying my invention;

Figure 2 is a side elevation of a portion of a wheel showing the brake band operating mechanism in section;

Figure 3 is a section through the control;

Figure 4 is a section through the check valve applied to the internal combustion engine.

Figure 5 illustrates in plan view a detail of the brake operating structure.

1 are the rear or drive wheels of the motor vehicle, 2 the front or steering wheels, and 3 the internal combustion engine. 4 are brake drums secured to each of the wheels, and 5 are brake bands surrounding the brake drums.

6 are the brake band operating mechanisms, each of which comprises the cylinder 7 having the reduced inner end 8 pivotally mounted at 9 upon the upwardly extending lugs 10 at one end of the brake band and the piston 11 slidable within the enlarged end of the cylinder and having the rod 12 slidable within the reduced end of the cylinder and provided with a collar 13 near its outer end pivotally mounted at 14 upon the upwardly extending lugs 15 at the other end of the brake band. The brake band is normaly held expanded by the coil spring 16 surrounding the piston rod and abutting the collar thereon and the reduced inner end of the cylinder. The brake band is contracted by movement of the piston 11 outwardly relative to the cylinder, this being accomplished by the entrance of combustion gases of the engine under pressure through the nipple 17 at the inner end of the enlarged portion of the cylinder. To protect the outside of the piston as well as the cylinder wall, I have provided the cap 18 threaded in the outer end of the cylinder and having the port 19 therein permitting of the free passage of air.

20 is a tank secured upon the frame of the motor vehicle and adapted to contain the combustion gases of the engine and to be placed in communication with the cylinders of the brake band operating mechanisms. For the purpose of preventing the passage of any of the explosive mixture from the engine to the tank, there is the valve 21 adapted to close the port 22 in the valve body 23 which forms part of the connection between the tank and one cylinder of the engine, the valve body being preferably carried by the pipe leading from the engine cylinder. This valve is held closed under a predetermined pressure which is sufficient to counterbalance the maximum pressure of the explosive mixture in the engine cylinder by means of a coil spring 24 surrounding the stem 25 of the valve and abutting the body 23 and the collar 26 upon the stem. However, the strength of the spring is insufficient to counterbalance the pressure exerted by the combustion gases within the cylinder so that a portion of these combustion gases pass from the cylinder to the tank upon the opening of the valve until the pressure of the combustion gases in the tank with the pressure exerted by the spring is sufficient to counterbalance the pressure of the combustion gases within the cylinder. 27 is a cylindrical housing threadedly secured to the body 23 and inclosing the outer or upper end of the valve stem, the collar, and the coil spring.

A single manually operated device controls the passage of the combustion gases under pressure from the tank 20 to the brake band operating mechanisms, this device being carried upon the foot board of the motor vehicle and having a headed stem 28 extending thereabove and adjacent to the clutch pedal and the accelerator. 29 is the hollow body of this device insertable through a suitably shaped aperture in the foot board and having at its upper end the angular flange 30 resting upon and secured to the foot board. 31 is a transverse partition near the lower end of the hollow body provided with a port 32 which is adapted to be closed by the valve 33 having a stem 34 extending axially of the body. 35 is a plug threadedly engaging the lower end of the body and forming with the partition 31 and the valve 33 when in closed position, a chamber 36 which is in communication at all times with the tank 20 through the pipe 21. The valve 33 is normally held in closed position by the coil spring 33' abutting the valve and plug. 37 is the second transverse partition in the body and spaced above the partition 31, this second partition having an upwardly extending boss 38 in which the valve stem 34 slides. The second partition has a series of apertures 39 which are always open. The chamber 40 formed in the body between its two transverse partitions is in communication with the pipes 41 and 42 extending longitudinally of the frame of the motor vehicle, the pipe 41 being connected to the nipples 17 of the actuating mechanisms for the brake bands of the rear wheels by the flexible pipes 43 and the pipe 42 being connected to the nipples of the actuating mechanisms for the brake bands of the front wheels by the flexible connections 44. 45 is the piston secured to the headed stem 28 and slidable within the upper end of the hollow body 29 and adapted to engage the upper end of the valve stem 34 to move the same downwardly, thereby moving the valve 33 to open position and allowing of the passage of the combustion gases within the tank 20 to the cylinders of the brake band actuating mechanisms. 45' is a coil spring abutting the lower end of the piston and the second transverse partition for normally holding the piston in its uppermost position. The hollow body 29 has the exhaust ports 46 which are located above the upper end of the valve stem 34 and slightly below the lower end of the piston 45 when in its uppermost position, the arrangement being such that prior to moving the valve to open position to place the tank in communication with the cylinders of the brake band actuating mechanisms, the exhaust ports are closed. However, as soon as the operator releases the pressure of his foot upon the headed stem, the piston moves upwardly under the pressure exerted by the combustion gases as well as the piston actuating coil spring and allows the valve to come to closed position and the exhaust ports to be opened, thereby relieving the pressure within the cylinders of the brake band actuating mechanisms. In operation, it may be desirable to partially relieve this pressure, and this is accomplished by momentarily permitting the piston to rise to expose the exhaust ports and then depressing the same sufficiently to close these exhaust ports, but not far enough to again move the valve to open position.

From the above description, it will be readily seen that I have provided a motor vehicle brake mechanism in which equal braking effect may be exerted upon all of the wheels of the motor vehicle and in which this braking pressure may be varied by a single manually operated control device. Also, I have provided a simple construction of brake band actuating mechanism which is mounted directly upon the brake band. Furthermore, the medium for actuating the brake band operating mechanisms is combustion gases only, of an internal combustion engine, the loss of which in the engine does not appreciably affect its operation or efficiency.

What I claim as my invention is:

A vehicle comprising, in combination, a road wheel having a brake drum, a brake band surrounding the drum and having a pivotally mounted member at each end thereof, a cylinder connected to one of said members and extending tangentially away from the pivotal connection of said member, a piston in said cylinder, a connecting rod for the piston passing through said member and mounted in the other member, and a spring surrounding the connecting rod between the members for urging the band to idle position.

In testimony whereof I affix my signature.

WILLIAM LINCOLN MARTIN.